(12) United States Patent
Walton et al.

(10) Patent No.: US 7,298,805 B2
(45) Date of Patent: Nov. 20, 2007

(54) MULTI-ANTENNA TRANSMISSION FOR SPATIAL DIVISION MULTIPLE ACCESS

(75) Inventors: J. Rodney Walton, Carlisle, MA (US); John W. Ketchum, Harvard, MA (US); John Edward Smee, San Diego, CA (US); Mark S. Wallace, Bedford, MA (US); Steven J. Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 733 days.

(21) Appl. No.: 10/719,802

(22) Filed: Nov. 21, 2003

(65) Prior Publication Data

US 2005/0111599 A1   May 26, 2005

(51) Int. Cl.
    H04L 1/02   (2006.01)
(52) U.S. Cl. ..................................... 375/347
(58) Field of Classification Search ............. 375/347, 375/346, 316, 349, 350, 295, 296, 259, 260, 375/285; 343/777, 776, 772, 700 R
    See application file for complete search history.

(56) References Cited

U.S. PATENT DOCUMENTS 6,512,737 B1 *  1/2003  Agee ...................... 370/208

2002/0177447 A1  11/2002  Walton
2003/0043929 A1   3/2003  Sampath

\* cited by examiner

Primary Examiner—Pankaj Kumar
(74) Attorney, Agent, or Firm—Thomas R. Rouse; Ross L. Franks; Thien T. Nguyen

(57) ABSTRACT

An uplink channel response matrix is obtained for each terminal and decomposed to obtain a steering vector used by the terminal to transmit on the uplink. An "effective" uplink channel response vector is formed for each terminal based on its steering vector and its channel response matrix. Multiple sets of terminals are evaluated based on their effective channel response vectors to determine the best set (e.g., with highest overall throughput) for uplink transmission. Each selected terminal performs spatial processing on its data symbol stream with its steering vector and transmits its spatially processed data symbol stream to an access point. The multiple selected terminals simultaneously transmit their data symbol streams via their respective MIMO channels to the access point. The access point performs receiver spatial processing on its received symbol streams in accordance with a receiver spatial processing technique to recover the data symbol streams transmitted by the selected terminals.

15 Claims, 8 Drawing Sheets

MULTI-ANTENNA TRANSMISSION FOR SPATIAL DIVISION MULTIPLE ACCESS

BACKGROUND

I. Field

The present invention relates generally to data communication, and more specifically to multi-antenna transmission for spatial division multiple access (SDMA) in a multiple-input multiple-output (MIMO) communication system.

II. Background

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ spatial channels, where $N_S \leq \min\{N_T, N_R\}$. The $N_S$ spatial channels may be used to transmit $N_S$ independent data streams to achieve greater overall throughput.

In a multiple-access MIMO system, an access point can communicate with one or more user terminals at any given moment. If the access point communicates with a single user terminal, then the $N_T$ transmit antennas are associated with one transmitting entity (either the access point or the user terminal), and the $N_R$ receive antennas are associated with one receiving entity (either the user terminal or the access point). The access point can also communicate with multiple user terminals simultaneously via SDMA. For SDMA, the access point utilizes multiple antennas for data transmission and reception, and each of the user terminals typically utilizes one antenna for data transmission and multiple antennas for data reception.

Some key challenges for SDMA in a multiple-access MIMO system are (1) selecting the proper set of user terminals for simultaneous transmission and (2) transmitting data to and/or from each selected user terminal in a manner to achieve good system performance. There is therefore a need in the art for techniques to efficiently support SDMA for a multiple-access MIMO system.

SUMMARY

Techniques for performing multi-antenna transmission for SDMA in a MIMO system are described herein. These techniques may be used in combination with various wireless technologies such as Code Division Multiple Access (CDMA), Orthogonal Frequency Division Multiplexing (OFDM), Time Division Multiple Access (TDMA), and so on. For uplink transmission by multiple user terminals to a single access point, an uplink channel response matrix is obtained for each active user terminal (e.g., a terminal desiring to transmit on the uplink) and decomposed to obtain a steering vector for the user terminal. Each user terminal uses its steering vector for spatial processing to transmit on the uplink, if selected for uplink transmission. An "effective" uplink channel response vector is formed for each user terminal based on the steering vector and the uplink channel response matrix for the user terminal.

For each scheduling interval (e.g., each time slot), multiple sets of active user terminals are formed and evaluated based on their effective channel response vectors (or their channel response matrices) to determine the best set of $N_{up}$ user terminals for uplink transmission in that scheduling interval. For example, the user set with the highest overall throughput may be selected. In effect, the spatial signatures of the user terminals as well as multi-user diversity are exploited to select a set of "spatially compatible" user terminals for simultaneous transmission on the uplink, as described below. The same or different number of user terminals may be selected for uplink transmission in different scheduling intervals.

Each user terminal selected for uplink transmission processes its data stream in accordance with the underlying wireless technology (e.g., CDMA, OFDM, or TDMA) to obtain a data symbol stream. Each user terminal further performs spatial processing on its data symbol stream with its steering vector to obtain a set of transmit symbol streams, one transmit symbol stream for each antenna at the user terminal. Each user terminal then transmits its transmit symbol streams from its multiple antennas and via its MIMO channel to the access point. The $N_{up}$ selected user terminals simultaneously transmit their $N_{up}$ data symbol streams (e.g., one data symbol stream for each terminal) via their respective MIMO channels to the access point. The access point obtains multiple received symbol streams from its multiple antennas. The access point then performs receiver spatial processing on the received symbol streams in accordance with a linear or non-linear receiver spatial processing technique to recover the $N_{up}$ data symbol streams transmitted by the $N_{up}$ selected user terminals, as described below.

The techniques to support SDMA transmission on the downlink are also described herein. Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The multi-antenna transmission techniques described herein may be used in combination with various wireless technologies such as CDMA, OFDM, TDMA, and so on. Multiple user terminals can concurrently transmit/receive data via different (1) orthogonal code channels for CDMA, (2) time slots for TDMA, or (3) subbands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art. The spatial processing for multi-antenna transmission may be performed on top of (either before or after) the data processing for the underlying wireless technology, as described below.

Figure 1:
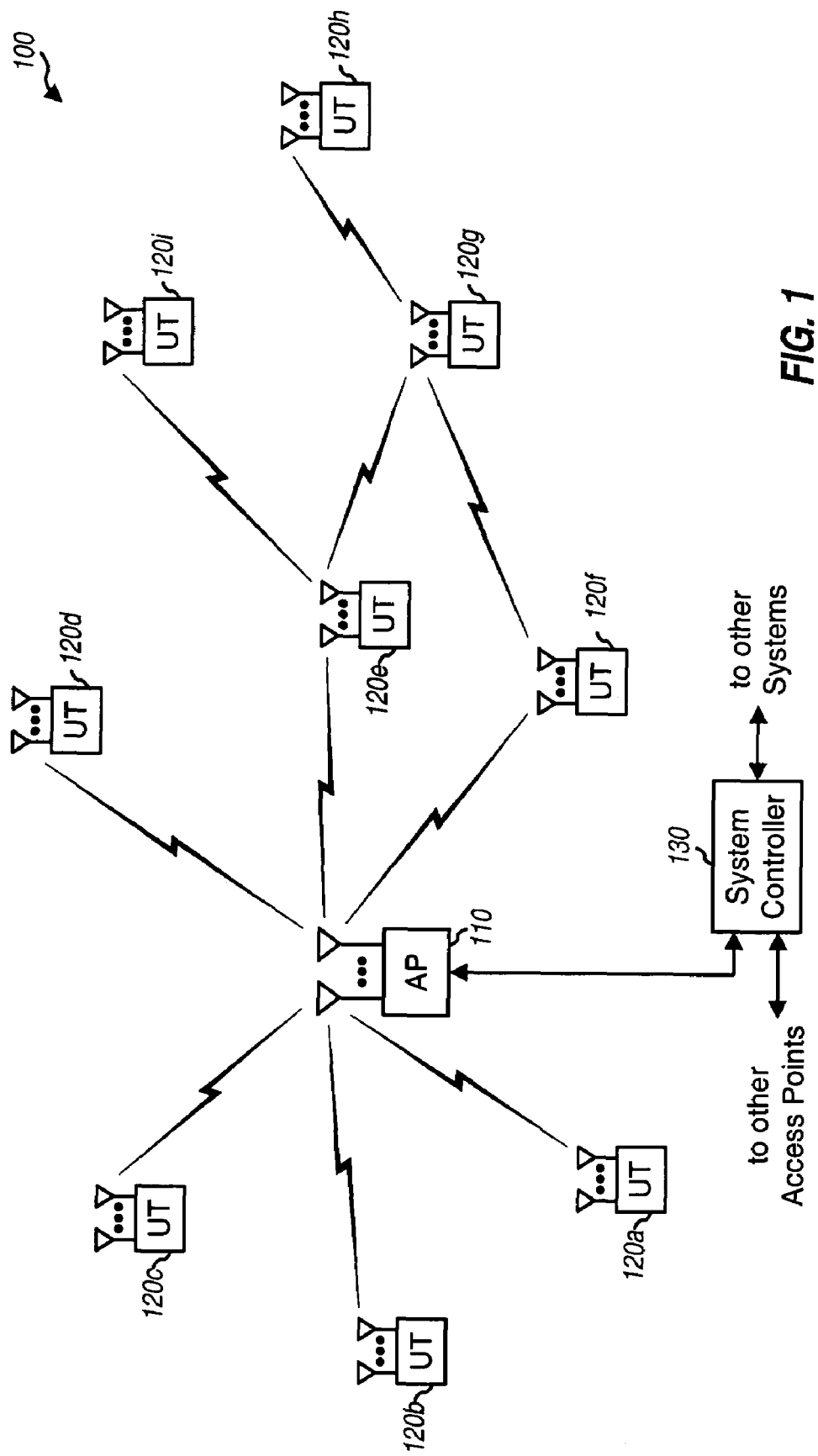
FIG. 1 shows a multiple-access MIMO system.

FIG. 1 shows a multiple-access MIMO system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with $N_{ap}$ antennas and represents the multiple-input (MI) for downlink transmissions and the multiple-output (MO) for uplink transmissions. A set of $N_u$ selected user terminals 120 collectively represents the multiple-output for downlink transmissions and the multiple-input for uplink transmissions. For pure SDMA, it is desired to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

System 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. For simplicity, the following description assumes that (1) system 100 is a single-carrier system and (2) each user terminal is equipped with multiple antennas. For clarity, data transmission on the uplink is described below.

An uplink MIMO channel formed by the $N_{ap}$ antennas at the access point and the $N_{ut,m}$ antennas at a given user terminal m may be characterized by an $N_{ap} \times N_{ut,m}$ channel response matrix $H_{up,m}$, which may be expressed as:

$$H_{up,m} = \begin{bmatrix} h_{1,1} & h_{1,2} & \cdots & h_{1,N_{ut,m}} \\ h_{2,1} & h_{2,2} & \cdots & h_{2,N_{ut,m}} \\ \vdots & \vdots & \ddots & \vdots \\ h_{N_{ap},1} & h_{N_{ap},2} & \cdots & h_{N_{ap},N_{ut,m}} \end{bmatrix}, \quad \text{Eq (1)}$$

where entry $h_{i,j}$, for $i=1 \ldots N_{ap}$ and $j=1 \ldots N_{ut,m}$, is the coupling (i.e., complex gain) between access point antenna i and user terminal antenna j. For simplicity, the MIMO channel is assumed to be non-dispersive (i.e., flat fading), and the coupling between each transmit and receive antenna pair is represented with a single complex gain $h_{i,j}$. In general, each user terminal is associated with a different uplink channel response matrix having dimensions determined by the number of antennas at that user terminal.

The uplink channel response matrix $H_{up,m}$ for user terminal m may be "diagonalized" using either singular value decomposition or eigenvalue decomposition to obtain $N_m$ eigenmodes of $H_{up,m}$. The singular value decomposition of $H_{up,m}$ may be expressed as:

$$H_{up,m} = U_{up,m} \Sigma_{up,m} V_{up,m}^H, \quad \text{Eq (2)}$$

where $U_{up,m}$ is an $N_{ap} \times N_{ap}$ unitary matrix of left eigenvectors of $H_{up,m}$;
$\Sigma_{up,m}$ is an $N_{ap} \times N_{ut,m}$ diagonal matrix of singular values of $H_{up,m}$;
$V_{up,m}$ is an $N_{ut,m} \times N_{ut,m}$ unitary matrix of right eigenvectors of $H_{up,m}$; and
"$H$" denotes the conjugate transpose.

A unitary matrix M is characterized by the property $M^H M = I$, where I is matrix. The columns of a unitary matrix are orthogonal to one another.

The eigenvalue decomposition of a correlation matrix of $H_{up,m}$ may be expressed as:

$$R_{up,m} = H_{up,m}^H H_{up,m} = V_{up,m} \Lambda_{up,m} V_{up,m}^H, \quad \text{Eq (3)}$$

where $R_{up,m}$ is the $N_{ut,m} \times N_{ut,m}$ correlation matrix of $H_{up,m}$; and
$\Lambda_{up,m}$ is an $N_{ut,m} \times N_{ut,m}$ diagonal matrix of eigenvalues of $R_{up,m}$.

Singular value decomposition and eigenvalue decomposition are known in the art and described, for example, by Gilbert Strang in "Linear Algebra and Its Applications," Second Edition, Academic Press, 1980.

As shown in equations (2) and (3), the columns of $V_{up,m}$ are the right eigenvectors of $H_{up,m}$ as well as the eigenvectors of $R_{up,m}$. The right eigenvectors of $H_{up,m}$ are also referred to as "steering" vectors and may be used for spatial processing by user terminal m to transmit data on the $N_m$ eigenmodes of $H_{up,m}$. The eigenmodes may be viewed as orthogonal spatial channels obtained through decomposition.

The diagonal matrix $\Sigma_{up,m}$ contains non-negative real values along the diagonal and zeros elsewhere. These diagonal entries are known as the singular values of $H_{up,m}$ and represent the channel gains for the $N_m$ eigenmodes of $H_{up,m}$. The singular values in $\Sigma_{up,m}$ are also the square roots of the eigenvalues in $\Lambda_{up,m}$. The singular values in $\Sigma_{up,m}$ may be ordered from largest to smallest, and the eigenvectors in $V_{up,m}$ may be ordered correspondingly. The principal (i.e., dominant) eigenmode is the eigenmode associated with the largest singular value in $\Sigma_{up,m}$, which is the first singular value after the ordering. The eigenvector for the principal eigenmode of $H_{up,m}$ is the first column of $V_{up,m}$ after the ordering and is denoted as $\underline{v}_{up,m}$.

In a practical system, only an estimate of $H_{up,m}$ can be obtained, and only estimates of $V_{up,m}$, $\Sigma_{up,m}$ and $U_{up,m}$ can be derived. For simplicity, the description herein assumes channel estimation and decomposition without errors.

With SDMA, $N_{up}$ user terminals can transmit data concurrently on the uplink to the access point. Each user terminal performs spatial processing on its data using a steering vector, which may be derived (1) based on the eigenvector $\underline{v}_{up,m}$ for the principal eigenmode of the wireless channel for that terminal or (2) in some other manner. Each of the $N_{up}$ user terminals can transmit data on the principal eigenmode of its uplink MIMO channel using either "beam-forming" or "beam-steering", as described below.

1. Beam-Forming

For beam-forming, each user terminal m spatially processes its data symbol stream $\{s_{up,m}\}$ with its steering vector $\underline{v}_{up,m}$ to obtain $N_{ut,m}$ transmit symbol streams, as follows:

$$\underline{x}_{up,m} = \underline{v}_{up,m} \cdot s_{up,m}, \quad \text{Eq (4)}$$

where $s_{up,m}$ is a data symbol to be transmitted by user terminal m; and $\underline{x}_{up,m}$ is an $N_{ut,m} \times 1$ vector with $N_{ut,m}$ transmit symbols to be sent from the $N_{ut,m}$ antennas at user terminal m.

As used herein, a "data symbol" refers to a modulation symbol for data, and a "pilot symbol" refers to a modulation symbol for pilot. Although not shown in equation (4) for simplicity, each user terminal m may further scale each of the $N_{ut,m}$ transmit symbols in the vector $\underline{x}_{up,m}$ with a scaling factor $G_m$ such that the total energy for the $N_{ut,m}$ transmit symbols is unity or some other selected value. Each user terminal m transmits its $N_{ut,m}$ transmit symbol streams via its uplink MIMO channel to the access point.

At the access point, the received symbols obtained for each user terminal m may be expressed as:

$$\underline{r}_{up,m} = H_{up,m}\underline{x}_{up,m} + \underline{n}_{up,m} = H_{up,m}\underline{v}_{up,m}s_{up,m} + \underline{n}_{up,m} = \underline{h}_{up,eff,m}s_{up,m} + \underline{n}_{up,m}, \quad \text{Eq (5)}$$

where $\underline{r}_{up,m}$ is an $N_{ap} \times 1$ vector with $N_{ap}$ received symbols obtained from the $N_{ap}$ access point antennas for user terminal m;

$\underline{h}_{up,eff,m}$ is an $N_{ap} \times 1$ "effective" uplink channel response vector for user terminal m, which is $\underline{h}_{up,eff,m} = H_{up,m}\underline{v}_{up,m}$; and $\underline{n}_{up,m}$ is an $N_{ap} \times 1$ noise vector for user terminal m.

The spatial processing by each user terminal m effectively transforms its MIMO channel with a channel response matrix of $H_{up,m}$ into a single-input multiple-output (SIMO) channel with a channel response vector of $\underline{h}_{up,eff,m}$.

The received symbols at the access point for all $N_{up}$ user terminals transmitting simultaneously may be expressed as:

$$\underline{r}_{up} = H_{up,eff}\underline{s}_{up} + \underline{n}_{up} \quad \text{Eq (6)}$$

$$= \sum_{m=1}^{N_{up}} \underline{r}_{up,m} = \sum_{m=1}^{N_{up}} \underline{h}_{up,eff,m}s_{up,m} + \underline{n}_{up,m},$$

where $\underline{s}_{up}$ is an $N_{up} \times 1$ vector with $N_{up}$ data symbols transmitted by the $N_{up}$ user terminals, which is $\underline{s}_{up} = [s_{up,1}, s_{up,2} \ldots s_{up,N_{ap}}]^T$;

$H_{up,eff}$ is an $N_{ap} \times N_{up}$ effective uplink channel response matrix for all $N_{up}$ user terminals, which is $H_{up,eff} = [\underline{h}_{up,eff,1} \, \underline{h}_{up,eff,2} \ldots \underline{h}_{up,eff,N_{ap}}]$; and $\underline{n}_{up}$ is an $N_{ap} \times 1$ noise vector at the access point.

The access point can recover the $N_{up}$ data symbol streams transmitted by the $N_{up}$ user terminals using various receiver processing techniques such as a channel correlation matrix inversion (CCMI) technique (which is also commonly referred to as a zero-forcing technique), a minimum mean square error (MMSE) technique, a successive interference cancellation (SIC) technique, and so on.

A. CCMI Spatial Processing

For the CCMI technique, the access point performs receiver spatial processing as follows:

$$\hat{\underline{s}}_{ccmi} = \underline{M}_{ccmi}\underline{r}_{up}, \quad \text{Eq (7)}$$

$$= \underline{R}_{up,eff}^{-1} H_{up,eff}^H (H_{up,eff}\underline{s}_{up} + \underline{n}_{up}),$$

$$= \underline{s}_{up} + \underline{n}_{ccmi},$$

where $M_{ccmi}$ is an $N_{up} \times N_{ap}$ spatial filter matrix for the CCMI technique, which is $M_{ccmi} = \underline{R}_{up,eff}^{-1} H_{up,eff}^H$, where $\underline{R}_{up,eff} = H_{up,eff}^H H_{up,eff}$;

$\hat{\underline{s}}_{ccmi}$ is an $N_{up} \times 1$ vector with $N_{up}$ recovered data symbols for the $N_{up}$ user terminals with the CCMI technique; and $\underline{n}_{ccmi} = M_{ccmi}\underline{n}_{up}$ is the CCMI filtered noise.

For simplicity, the noise $\underline{n}_{up}$ is assumed to be additive white Gaussian noise (AWGN) with zero mean, a variance of $\sigma_n^2$, and an autocovariance matrix of $\phi_{nn} = E[\underline{n}_{up}\underline{n}_{up}^H] = \sigma_n^2 I$, where $E[x]$ is the expected value of x. In this case, the signal-to-noise-and-interference ratio (SNR) of the recovered data symbol stream $\{\hat{s}_{ccmi,m}\}$ for each user terminal m may be expressed as:

$$\gamma_{ccmi,m} = \frac{P_{ut,m}}{r_{mm}\sigma_n^2}, \text{ for } m = 1 \ldots N_{up}, \quad \text{Eq (8)}$$

where $P_{ut,m}$ is the transmit power used by user terminal m;

$r_{mm}$ is the m-th diagonal element of $\underline{R}_{up,eff}$; and $\gamma_{ccmi,m}$ is the SNR for user terminal m with the CCMI technique.

Due to the structure of $\underline{R}_{up,eff}$, the CCMI technique may amplify the noise.

B. MMSE Spatial Processing

For the MMSE technique, a spatial filter matrix $M_{mmse}$ is derived such that the mean square error between the estimated data vector from the MMSE spatial filter and the data vector $\underline{s}_{up}$ is minimized. This MMSE criterion may be expressed as:

$$\min_{M_{mmse}} E[(M_{mmse}\underline{r}_{up} - \underline{s}_{up})^H(M_{mmse}\underline{r}_{up} - \underline{s}_{up})], \quad \text{Eq (9)}$$

where $M_{mmse}$ is the $N_{up} \times N_{ap}$ spatial filter matrix for the MMSE technique.

The solution to the optimization problem posed in equation (9) may be obtained in various manners. In one exemplary method, the MMSE spatial filter matrix $M_{mmse}$ is derived as:

$$M_{mmse} = H_{up,eff}^H [H_{up,eff}H_{up,eff}^H + \sigma_n^2 I]^{-1}. \quad \text{Eq (10)}$$

The spatial filter matrix $M_{mmse}$ contains $N_{up}$ rows for $N_{up}$ MMSE spatial filter row vectors for the $N_{up}$ user terminals. The MMSE spatial filter row vector for each user terminal may be expressed as $\underline{m}_{mmse,m} = \underline{h}_{up,eff,m}^H G$, where $G = [H_{up,eff}H_{up,eff}^H + \sigma_n^2 I]^{-1}$.

The access point performs receiver spatial processing as follows:

$$\hat{\underline{s}}_{mmse} = D_{mmse}^{-1} M_{mmse}\underline{r}_{up}, \quad \text{Eq (11)}$$

-continued $$\hat{s}_{mmse} = D_{mmse}^{-1} M_{mmse} (H_{up,eff} \underline{s}_{up} + \underline{n}_{up}),$$

$$= \underline{s}_{up} + \underline{n}_{mmse},$$

where $D_{mmse}$ is an $N_{up} \times N_{up}$ diagonal matrix whose diagonal elements are the diagonal elements of $M_{mmse} H_{up,eff}$, i.e., $D_{mmse} = \text{diag}[M_{mmse} H_{up,eff}]$;

$\hat{\underline{s}}_{mmse}$ is an $N_{up} \times 1$ recovered data symbol vector for the MMSE technique; and $\underline{n}_{mmse} = M_{mmse} \underline{n}_{up}$ is the MMSE filtered noise.

In equation (11), the MMSE spatial filter provides an unnormalized estimate of $\underline{s}_{up}$, and the scaling by the diagonal matrix $D_{mmse}^{-1}$ provides a normalized estimate of $\underline{s}_{up}$.

The SNR of the recovered data symbol stream $\{\hat{s}_{mmse,m}\}$ for each user terminal m may be expressed as:

$$\gamma_{mmse,m} = \frac{q_{mm}}{1-q_{mm}} P_{ut,m}, \text{ for } m = 1 \ldots N_{up}, \quad \text{Eq (12)}$$

where $q_{mm}$ is the m-th diagonal element of $M_{mmse} H_{up,eff}$, i.e., $q_{mm} = \underline{m}_{mmse,m} \underline{h}_{up,eff,m}$; and $\gamma_{mmse,m}$ is the SNR for user terminal m with the MMSE technique.

C. Successive Interference Cancellation Spatial Processing

The access point can process the $N_{ap}$ received symbol streams using the SIC technique to recover the $N_{up}$ data symbol streams. For the SIC technique, the access point initially performs spatial processing on the $N_{ap}$ received symbol streams (e.g., using CCMI, MMSE, or some other technique) and obtains one recovered data symbol stream. The access point then processes (e.g., demodulates/symbol demaps, deinterleaves, and decodes) this recovered data symbol stream to obtain a decoded data stream. The access point next estimates the interference this stream causes to the other $N_{up}-1$ data symbol streams and cancels the estimated interference from the $N_{ap}$ received symbol streams to obtain $N_{ap}$ modified symbol streams. The access point then repeats the same processing on the $N_{ap}$ modified symbol streams to recover another data symbol stream.

For the SIC technique, the input (i.e., received or modified) symbol streams for stage l, where $l=1 \ldots N_{up}$, may be expressed as:

$$\underline{r}_{sic}^l(k) = H_{up,eff}^l \underline{s}_{up}^l + \underline{n}_{up}^l, \quad \text{Eq (13)}$$

where $\underline{r}_{sic}^l$ is an $N_{ap} \times 1$ vector with $N_{ap}$ input symbols for stage l, and $\underline{r}_{sic}^l = \underline{r}_{up}$ for the first stage;

$\underline{s}_{up}^l$ is an $N_{nr} \times 1$ vector for $N_{nr}$ data symbol streams not yet recovered at stage l, where $N_{nr} = N_{up} - l + 1$; and $H_{up,eff}^l$ is an $N_{ap} \times N_{nr}$ reduced effective channel response matrix for stage l.

Equation (13) assumes that the data symbol streams recovered in the l-1 prior stages are canceled. The dimensionality of the effective channel response matrix $H_{up,eff}$ successively reduces by one column for each stage as a data symbol stream is recovered and canceled. For stage l, the reduced effective channel response matrix $H_{up,eff}^l$ is obtained by removing l-1 columns in the original matrix $H_{up,eff}$ corresponding to the l-1 data symbol streams already recovered in prior stages, i.e., $H_{up,eff}^l = [\underline{h}_{up,eff,j_l} \ \underline{h}_{up,eff,j_{l+1}} \ \ldots \ \underline{h}_{up,eff,j_{N_{up}}}]$, where $\underline{h}_{up,eff,j_n}$ is an $N_{ap} \times 1$ effective channel response vector for user terminal $j_n$. For stage l, the l-1 data symbol streams recovered in the prior stages are given indices of $\{j_1 j_2 \ldots j_{l-1}\}$ and the $N_{nr}$ data symbol streams not yet recovered are given indices of $\{j_l j_{l+1} \ldots j_{N_{up}}\}$.

For stage l, the access point derives an $N_{nr} \times N_{ap}$ spatial filter matrix $M_{sic}^l$ based on the reduced effective channel response matrix $H_{up,eff}^l$ (instead of the original matrix $H_{up,eff}$) using the CCMI, MMSE, or some other technique. Since $H_{up,eff}^l$ is different for each stage, the spatial filter matrix $M_{sic}^l$ is also different for each stage.

The access point multiplies the vector $\underline{r}_{sic}^l$ for the $N_{ap}$ modified symbol streams with the spatial filter matrix $M_{sic}^l$ to obtain a vector $\tilde{\underline{s}}_{sic}^l$ for $N_{nr}$ detected symbol streams, as follows:

$$\tilde{\underline{s}}_{sic}^l = M_{sic}^l \underline{r}_{sic}^l, \quad \text{Eq (14)}$$

$$= M_{sic}^l (H_{up,eff}^l \underline{s}_{up}^l + \underline{n}_{up}),$$

$$= Q_{sic}^l \underline{s}_{up}^l + \underline{n}_{sic}^l,$$

where $Q_{sic}^l = M_{sic}^l H_{up,eff}^l$ and $\underline{n}_{sic}^l = M_{sic}^l \underline{n}$ is the filtered noise for stage l. The access point then selects one of the $N_{nr}$ detected symbol streams for recovery, where the selection criterion may be based on SNR and/or other factors. For example, the detected symbol stream with the highest SNR among the $N_{nr}$ detected symbol streams may be selected for recovery. Since only one data symbol stream is recovered in each stage, the access point can simply derive one $1 \times N_{ap}$ spatial filter row vector $\underline{m}_{j_l}^l$ for the data symbol stream $\{s_{up,j_l}\}$ to be recovered in stage l. The row vector $\underline{m}_{j_l}^l$ is one row of the matrix $M_{sic}^l$. In this case, the spatial processing for stage l to recover the data symbol stream $\{s_{up,j_l}\}$ may be expressed as:

$$\tilde{s}_{up,j_l} = \underline{m}_{j_l}^l \underline{r}_{sic}^l = \underline{q}_{j_l}^l \underline{s}_{up}^l + \underline{m}_{j_l}^l \underline{n}_{up}, \quad \text{Eq (15)}$$

where $\underline{q}_{j_l}^l$ is the row of $Q_{sic}^l$ corresponding to data symbol stream $\{s_{up,j_l}\}$;

In any case, the access point scales the detected symbol stream $\{\tilde{s}_{up,j_l}\}$ to obtain a recovered data symbol stream $\{\hat{s}_{up,j_l}\}$ and further demodulates, deinterleaves, and decodes this stream $\{\hat{s}_{up,j_l}\}$ to obtain a decoded data stream $\{\hat{d}_{up,j_l}\}$. The access point also forms an estimate of the interference this stream causes to the other data symbol streams not yet recovered. To estimate the interference, the access point re-encodes, interleaves, and modulates the decoded data stream $\{\hat{d}_{up,j_l}\}$ in the same manner as performed at user terminal $j_l$ and obtains a stream of "remodulated" symbols $\{\check{s}_{up,j_l}\}$, which is an estimate of the data symbol stream $\{s_{up,j_l}\}$ just recovered. The access point then spatially processes the remodulated symbol stream with the effective channel response vector $\underline{h}_{up,eff,j_l}$ for user terminal $j_l$ to obtain a vector $\underline{i}_{j_l}$ with $N_{ap}$ interference components caused by this stream. The $N_{ap}$ interference components $\underline{i}_{j_l}$ are then subtracted from the $N_{ap}$ modified symbol streams $\underline{r}_{sic}^l$ for stage l to obtain $N_{ap}$ modified symbol streams $\underline{r}_{sic}^{l+1}$ for the next stage l+1, i.e., $\underline{r}_{sic}^{l+1} = \underline{r}_{sic}^l - \underline{i}_{j_l}$. The modified symbol streams $\underline{r}_{sic}^{l+1}$ represent the streams that would have been received by the access point if the data symbol stream $\{s_{up,j_l}\}$ had not been transmitted (i.e., assuming that the interference cancellation was effectively performed).

The access point processes the $N_{ap}$ received symbol streams in $N_{up}$ successive stages. For each stage, the access point (1) performs receiver spatial processing on either the $N_{ap}$ received symbol streams or the $N_{ap}$ modified symbol streams from the preceding stage to obtain one recovered data symbol stream, (2) processes this recovered data symbol stream to obtain a corresponding decoded data stream, (3) estimates and cancels the interference due to this stream, and (4) obtains $N_{ap}$ modified symbol streams for the next stage. If the interference due to each data stream can be accurately estimated and canceled, then later recovered data streams experience less interference and may be able to achieve higher SNRs.

For the SIC technique, the SNR of each recovered data symbol stream is dependent on (1) the spatial processing technique (e.g., CCMI or MMSE) used for each stage, (2) the specific stage in which the data symbol stream is recovered, and (3) the amount of interference due to data symbol streams recovered in subsequent stages. In general, the SNR progressively improves for data symbol streams recovered in later stages because the interference from data symbol streams recovered in prior stages is canceled. This then allows higher rates to be used for data symbol streams recovered later.

2. Beam-Steering

For beam-steering, each user terminal m performs spatial processing with a normalized steering vector $\tilde{v}_{up,m}$, which is derived using the phase information in the steering vector $v_{up,m}$. The normalized steering vector $\tilde{v}_{up,m}$ may be expressed as:

$$\tilde{v}_{up,m} = [Ae^{j\theta_{m,1}} Ae^{j\theta_{m,2}} \ldots Ae^{j\theta_{m,N_{ut}}}]^T, \quad \text{Eq (16)}$$

where A is a constant (e.g., $A=1/\sqrt{N_{ut,m}}$); and
$\theta_{m,i}$ is the phase for antenna i at user terminal m, which is:

$$\theta_{m,i} = \angle v_{up,m,i} = \tan^{-1}\left(\frac{\text{Im}\{v_{up,m,i}\}}{\text{Re}\{v_{up,m,i}\}}\right). \quad \text{Eq (17)}$$

As shown in equation (16), the $N_{ut,m}$ elements of $\tilde{v}_{up,m}$ have equal magnitude. As shown in equation (17), the phase of each element in $\tilde{v}_{up,m}$ is equal to the phase of a corresponding element in $v_{up,m}$ (i.e., $\theta_{m,i}$ is obtained from $v_{up,m,i}$, where $v_{up,m} = [v_{up,m,1} \ v_{up,m,2} \ldots v_{up,m,N_{ut}}]^T$).

Each user terminal m spatially processes its data symbol stream $\{s_{up,m}\}$ with its normalized steering vector $\tilde{v}_{up,m}$ to obtain $N_{ut,m}$ transmit symbol streams, as follows:

$$\tilde{x}_{up,m} = \tilde{v}_{up,m} \cdot s_{up,m}. \quad \text{Eq (18)}$$

The constant A in equation (16) may be selected such that the total energy of the $N_{ut,m}$ transmit symbols in the vector $\tilde{x}_{up,m}$ is unity or some other selected value. The $N_{ap} \times 1$ effective uplink channel response vector $\tilde{h}_{up,eff,m}$ for each user terminal m with beam-steering may be expressed as:

$$\tilde{h}_{up,eff,m} = H_{up,m} \tilde{v}_{up,m}. \quad \text{Eq (19)}$$

The $N_{ap} \times N_{up}$ effective uplink channel response matrix $\tilde{H}_{up,eff}$ for all $N_{up}$ user terminal for beam-steering is then $\tilde{H}_{up,eff} = [\tilde{h}_{up,eff,1} \ \tilde{h}_{up,eff,2} \ldots \tilde{h}_{up,eff,N_{up}}]$.

The access point can perform receiver spatial processing using the CCMI, MMSE, or SIC technique described above, or some other technique. However, the spatial filter matrix is derived with the matrix $\tilde{H}_{up,eff}$ instead of the matrix $H_{up,eff}$.

3. SDMA Transmission

Figure 2:
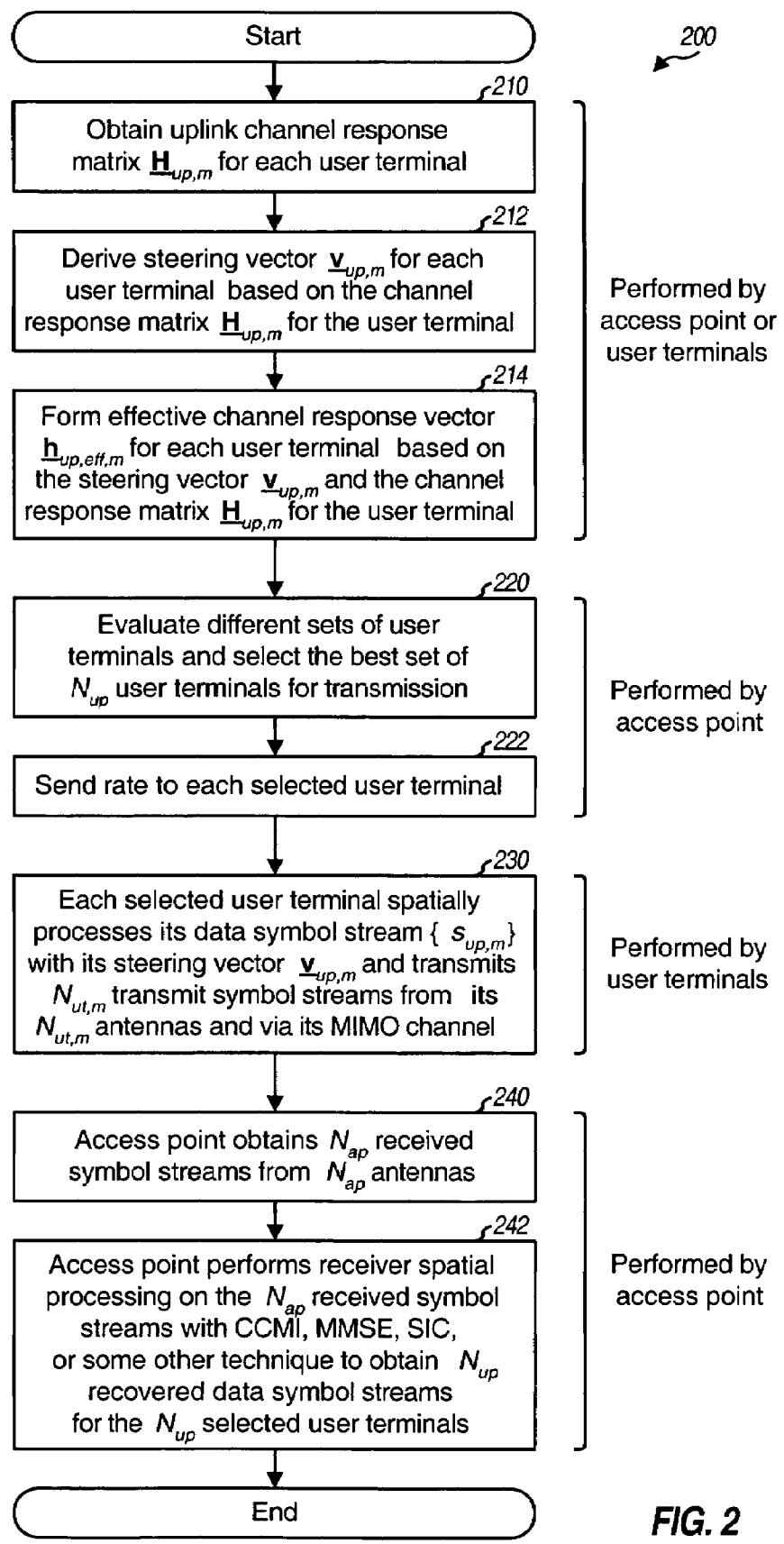
FIG. 2 shows a process for performing multi-antenna transmission on the uplink for SDMA.

FIG. 2 shows a process 200 for performing multi-antenna transmission on the uplink for SDMA. Initially, an uplink channel response matrix $H_{up,m}$ is obtained for each active user terminal desiring to transmit on the uplink (block 210). The matrix $H_{up,m}$ for each user terminal is decomposed to obtain a steering vector $v_{up,m}$ or $\tilde{v}_{up,m}$ for the user terminal (block 212). An effective uplink channel response vector $h_{up,eff,m}$ is formed for each user terminal based on the steering vector and the uplink channel response matrix for the user terminal (block 214). Blocks 210 through 214 are for channel estimation and decomposition and may be performed by the access point, the user terminals, or both.

Different sets of active user terminals are formed and evaluated based on their effective uplink channel response vectors $h_{up,eff,m}$ or their uplink channel response matrices $H_{up,m}$ (block 220). The evaluation may be performed as described below. The best set of $N_{up}$ user terminals is selected for transmission (also block 220). The rate to use by each selected user terminal (which is obtained from the evaluation in block 220) is sent to the user terminal (block 222). Blocks 220 and 222 are for user scheduling and are typically performed by the access point.

Each selected user terminal performs spatial processing on its data symbol stream $\{s_{up,m}\}$ with its steering vector $v_{up,m}$ or $\tilde{v}_{up,m}$ and transmits $N_{ut,m}$ transmit symbol streams from its $N_{ut,m}$ antennas and via its MIMO channel to the access point (block 230). The $N_{up}$ selected user terminals simultaneously transmit their $N_{up}$ data symbol streams via their MIMO channels to the access point. Block 230 is for data transmission and is performed by each selected user terminal.

The access point obtains $N_{ap}$ received symbol streams from its $N_{ap}$ antennas (block 240). The access point then performs receiver spatial processing on the $N_{ap}$ received symbol streams in accordance with the CCMI, MMSE, SIC, or some other technique to obtain $N_{up}$ recovered data symbol streams, which are estimates of the $N_{up}$ data symbol streams transmitted by the $N_{up}$ selected user terminals (block 242). Blocks 240 and 242 are for data reception and are performed by the access point.

Multiple user terminals can be selected for simultaneous transmission on the uplink. The user selection may be based on various factors. Some factors may relate to system constraints and requirements such as quality of service, maximum latency, average data rate, and so on. These factors may need to be satisfied for each user terminal. Other factors may relate to system performance, which may be quantified by overall system throughput or some other indication of performance. A scheduling scheme can evaluate user terminals for transmission based on one or more metrics and one or more factors. Different scheduling schemes may use different metrics, take into account different factors, and/or weigh the metrics and factors differently.

Regardless of the particular scheduling scheme selected for use, different sets of user terminals can be evaluated in accordance with the scheduling scheme. The "spatial signatures" of the individual user terminals (e.g., their MIMO channel responses) and multi-user diversity can be exploited to select the "best" set of "spatially compatible" user terminals for simultaneous transmission. Spatial compatibility may be quantified by a metric such as overall throughput or some other measure of performance. The best user set may be the one that achieves the highest score for the metric (e.g., the highest overall throughput) while conforming to the system constraints and requirements.

For clarity, a specific scheduling scheme that selects user terminals based on overall throughput is described below. In the following description, $N_{act}$ user terminals are active and desire to transmit data on the uplink.

Figure 3:
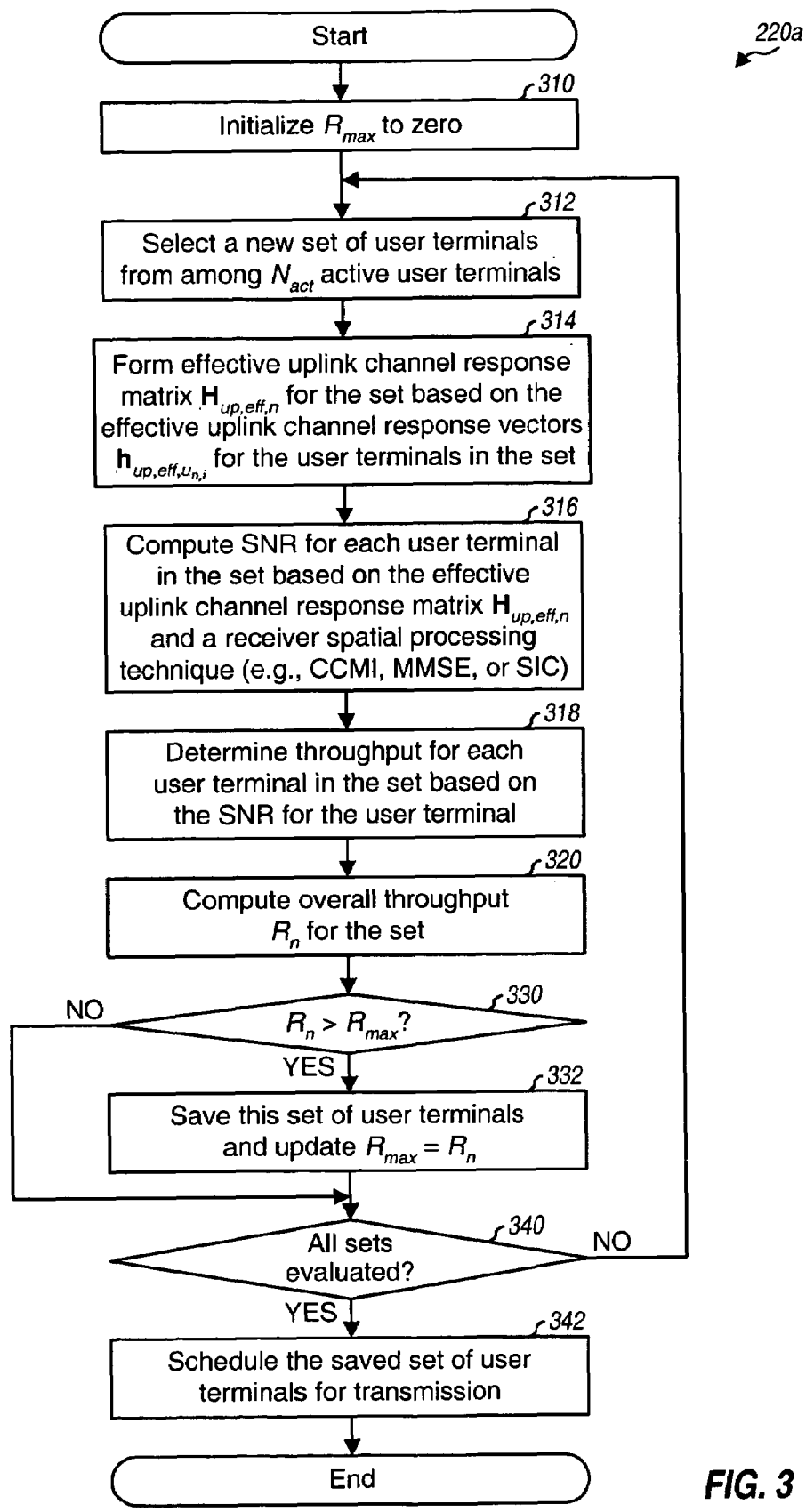
FIG. 3 shows a process for evaluating and selecting user terminals for simultaneous transmission on the uplink.

FIG. 3 shows a process 220a for evaluating and selecting user terminals for transmission on the uplink. Process 220a represents a specific scheduling scheme and may be used for block 220 in FIG. 2. Initially, a variable $R_{max}$ for the highest overall throughput is set to zero (block 310).

A new set of user terminals is selected from among the $N_{act}$ active user terminals (block 312). This user set forms a hypothesis to be evaluated and is denoted as $\underline{u}_n = \{u_{n,1}\ u_{n,2}\ \ldots\ u_{n,N_{up}}\}$, where n denotes the n-th user set being evaluated and $u_{n,i}$ is the i-th user terminal in set n. An effective uplink channel response matrix $H_{up,eff,n}$ is formed for user set n with the effective uplink channel response vectors $h_{up,eff,u_{n,1}}$ through $$h_{up,eff,u_{n,N_{up}}}$$

for the $N_{up}$ user terminals in set n (block 314).

The SNR for each user terminal in set n is then computed based on the effective uplink channel response matrix $H_{up,eff,n}$ and using the CCMI, MMSE, SIC, or some other technique employed by the access point (block 316). The SNRs for the user terminals with the CCMI and MMSE techniques can be computed as shown in equations (8) and (12), respectively. The SNRs for the user terminals with the SIC technique are dependent on the order in which the user terminals are recovered. For the SIC technique, one or multiple orderings of user terminals may be evaluated. For example, a specific ordering may be evaluated whereby the user terminal with the highest SNR at each stage is processed by the access point. In any case, the SNRs for the $N_{up}$ user terminals in set n are denoted as $\{\gamma_{n,1}\ \gamma_{n,2}\ \cdots\ _{n,N_{up}}\}$.

The throughput for each user terminal in set n is then computed based on the SNR for the user terminal (block 318), as follows:

$$r_{n,i} = \cdot \log_2\left(1 + \frac{\gamma_{n,i}}{c_{n,i}}\right), \text{ for } i = 1\ldots N_{up}, \quad \text{Eq (20)}$$

where $c_{n,i}$ is a positive constant that reflects the fraction of the theoretical capacity achieved by the coding and modulation schemes to be used by user terminal $u_{n,i}$ (e.g., $c_{n,i}=2$ for a coding and modulation scheme that is 3 dB from Shannon capacity) and $r_{n,i}$ is the throughput or spectral efficiency for user terminal $u_{n,i}$ given in units of bits per second per Hertz (bps/Hz). The overall throughput $R_n$ achieved by user set n can be computed (block 320), as follows:

$$R_n = \sum_{i=1}^{N_{up}} r_{n,i}. \quad \text{Eq (21)}$$

A determination is then made whether or not the overall throughput $R_n$ for user set n is greater than the maximum overall throughput achieved thus far for all user sets that have been evaluated (block 330). If the answer is yes, then user set n and the overall throughput $R_n$ for this set are saved (block 332). Otherwise, user set n is discarded.

A determination is then made whether or not all user sets have been evaluated (block 340). If the answer is no, then the process returns to block 312 to select another set of user terminals for evaluation. Otherwise, the user terminals in the saved set are scheduled for transmission on the uplink (block 342).

For the embodiment described above, a metric based on theoretical capacity (albeit with a compensation factor $c_{n,i}$) is used to select the best user set for uplink transmission. In another embodiment, a metric based on realizable throughput is used to select the best user set. For this embodiment, the user sets may be evaluated based on a set of "rates" supported by the system. These rates may be viewed as quantized values of the throughputs computed in equation (20). Each non-zero rate is associated with specific coding and modulation schemes, a particular spectral efficiency (which is typically given in units of bps/Hz), and a particular required SNR. The required SNR for each rate may be determined by computer simulation, empirical measurement, and so on, and based on an assumption of an AWGN channel. A look-up table (LUT) can store the set of supported rates and their required SNRs. The SNR for each user terminal is mapped to a selected rate, which is the highest rate in the look-up table with a required SNR that is equal to or lower than the SNR for the user terminal. The selected rates for all user terminals in each set are accumulated to obtain an aggregate rate for the set. The user set with the highest aggregate rate is scheduled for transmission.

User sets of different sizes may be evaluated to determine the best user set for transmission. For example, sets with one user terminal (i.e., $N_{up}=1$) may be evaluated first, then sets with two user terminals (i.e., $N_{up}=2$) may be evaluated next, and so on, and sets with $N_{ap}$ user terminals (i.e., $N_{up}=N_{ap}$) may be evaluated last.

Depending on the values for $N_{up}$, $N_{act}$ and $N_{ap}$, a large number of user sets may need to be evaluated for an exhaustive search for the best user set. The number of user sets to evaluate may be reduced by prioritizing the active user terminals, considering other factors, and so on. The priority of each active user terminal may be determined based on various factors such as the service category for the user terminal (e.g., premium or normal), the average throughput achieved by the user terminal, the amount of data the user terminal has to send, the delay experienced by the user terminal, and so on. The priority of each user terminal may be updated over time to reflect the current status of the user terminal. As an example, only the $N_{ap}$ highest priority user terminals may be evaluated in each scheduling interval.

In the exemplary scheduling scheme described above for FIG. 3, the effective uplink channel response vector $h_{up,eff,u_{n,i}}$ is derived independently (or "locally") for each user terminal based only on the uplink channel response matrix $H_{up,u_{n,i}}$ for the user terminal. The effective channel response matrix $H_{up,eff,n}$ for each user set n is formed with the independently derived effective channel response vectors for the user terminals in the set. The vectors $h_{up,eff,u_{n,i}}$, for i=1 . . . $N_{up}$, in the matrix $H_{up,eff,n}$ may not yield the highest possible overall throughput for user set n. Multiple sub-hypotheses may be evaluated for each user set, where the vectors in $H_{up,eff,n}$ may be adjusted by different amounts for each sub-hypothesis. For example, the phases of the steering vectors for the user terminals in set n may be modified in a deterministic manner (e.g., by some ±percentage) or in a pseudo-random manner for each sub-hypothesis while maintaining the power of each steering vector at unity (i.e., a unit norm for each steering vector).

A scheduling scheme may also evaluate each user set n based on the uplink MIMO channel response matrices $H_{up,u_{n,i}}$ instead of the effective uplink channel response vectors $h'_{up,eff,u_{n,i}}$ for the user terminals in the set. A steering vector $\underline{v}'_{up,u_{n,i}}$ may be derived ("globally") for each user terminal in set n in the presence of all user terminals in the set. The effective uplink channel response vector $h'_{up,eff,u_{n,i}}$ for each user terminal can be computed based on the (globally derived) steering vector $\underline{v}'_{up,u_{n,i}}$ and the uplink channel response matrix $H_{up,u_{n,i}}$ as follows: $h'_{up,eff,u_{n,i}} = H_{up,u_{n,i}} \underline{v}'_{up,u_{n,i}}$. An effective uplink channel response matrix $H'_{up,eff,n}$ is then formed for user set n based on the effective uplink channel response vectors $h'_{up,eff,u_{n,i}}$ for the user terminals in the set. The performance (e.g., overall throughput) of user set n is then evaluated with the matrix $H'_{up,eff,n}$ (instead of the matrix $H_{up,eff,n}$). As an example, multiple sub-hypotheses may be evaluated for user set n, where each sub-hypothesis corresponds to a different set of steering vectors for the user terminals in the set. The best sub-hypothesis is then selected for user set n. Multiple user sets may be evaluated in similar manner and the best user set is selected for uplink transmission.

Various other scheduling schemes may also be implemented and this is within the scope of the invention. Different scheduling schemes may consider different factors in selecting the user terminals for each set, derive the steering vectors for the user terminals in different manners, use other metrics to quantify the performance of each user set, and so on.

The uplink channel response matrix $H_{up,m}$ for each user terminal m may be estimated in various manners. Different channel estimation techniques may be used for TDD and FDD systems.

In an FDD system, the downlink and uplink use different frequency bands. The channel response for one link may not be correlated with the channel response for the other link. In this case, the access point can estimate the uplink MIMO channel response for each user terminal based on a pilot transmitted by the user terminal. The access point can perform decomposition of $H_{up,m}$ for each user terminal, derive the steering vector $\underline{v}_{up,m}$ or $\underline{\tilde{v}}_{up,m}$, and send the steering vector to each user terminal selected for transmission.

For the FDD system, each user terminal m can transmit an unsteered pilot (or a MIMO pilot) to allow the access point to estimate the uplink MIMO channel response and obtain the matrix $H_{up,m}$. The unsteered pilot comprises $N_{ut,m}$ orthogonal pilot transmissions sent from $N_{ut,m}$ user terminal antennas, where orthogonality may be achieved in time, frequency, code, or a combination thereof. For code orthogonality, user terminal m sends $N_{ut,m}$ pilot transmissions simultaneously from its $N_{ut,m}$ antennas, with the pilot transmission from each antenna being "covered" with a different orthogonal (e.g., Walsh) sequence. The access point "decovers" the received pilot symbols from each access point antenna i with the same $N_{ut,m}$ orthogonal sequences used by user terminal m to obtain estimates of the complex channel gain between access point antenna i and each of the $N_{ut,m}$ user terminal antennas. The covering at the user terminal and the decovering at the access point can be performed in similar manner as for a Code Division Multiple Access (CDMA) system. For frequency orthogonality, the $N_{ut,m}$ pilot transmissions for the $N_{ut,m}$ user terminal antennas can be sent simultaneously on different subbands of the overall system bandwidth. For time orthogonality, the $N_{ut,m}$ pilot transmissions for the $N_{ut,m}$ user terminal antennas can be sent in different time slots. In any case, the orthogonality among the $N_{ut,m}$ pilot transmissions allows the access point to distinguish the pilot transmission from each user terminal antenna.

Multiple user terminals can simultaneously transmit unsteered pilots on the uplink to the access point. The pilot transmissions for all user terminals are orthogonal in code, time, and/or frequency to allow the access point to estimate the uplink channel response for each user terminal.

In a TDD system, the downlink and uplink share the same frequency band. A high degree of correlation normally exists between the downlink and uplink channel responses. However, the responses of the transmit/receive chains at the access point may not be the same as the responses of the transmit/receive chains at the user terminal. If the differences can be determined via calibration and accounted for by applying the proper correction matrices at the access point and/or user terminal, then the overall downlink and uplink channel responses may be assumed to be reciprocal (i.e., transpose) of each other.

For the TDD system, the access point can transmit an unsteered pilot from $N_{ap}$ access point antennas. Each user terminal m can (1) process the downlink unsteered pilot to obtain its downlink MIMO channel response matrix $H_{dn,m}$, (2) estimate the uplink MIMO channel response as the transpose of the downlink MIMO channel response (i.e., $H_{up,m} \cong H_{dn,m}^T$), (3) derive the steering vector $\underline{v}_{up,m}$ or $\underline{\tilde{v}}_{up,m}$ based on $H_{up,m}$, and (4) compute the effective uplink channel response vector $h_{up,eff,m}$. Each user terminal can send the vector $h_{up,eff,m}$ to the access point in a direct form (e.g., by sending the entries of $h_{up,eff,m}$) or an indirect form (e.g., by transmitting a steered pilot that is generated with the steering vector $\underline{v}_{up,m}$ or $\underline{\tilde{v}}_{up,m}$ used for uplink transmission).

For clarity, the SDMA transmission techniques have been described for uplink transmission. These techniques may also be used for downlink transmission. A downlink MIMO channel response matrix $H_{dn,m}$ can be obtained for each user terminal m and decomposed to obtain a downlink steering vector $\underline{v}_{dn,m}$ for the user terminal. The access point can evaluate different sets of user terminals for downlink transmission (e.g., in similar manner as that described above for the uplink) and select the best set of $N_{dn}$ user terminals for downlink transmission.

For downlink transmission, the access point spatially processes $N_{dn}$ data symbol streams with $N_{dn}$ downlink steering vectors for the $N_{dn}$ selected user terminals to obtain $N_{ap}$ transmit symbol streams, as follows:

$$x_{dn} = V_{dn} \underline{s}_{dn}, \qquad \text{Eq (22)}$$

where $\underline{s}_{dn}$ is an $N_{dn} \times 1$ vector with $N_{dn}$ data symbols to be transmitted on the downlink to the $N_{dn}$ selected user terminals;

$V_{dn}$ is an $N_{ap} \times N_{dn}$ matrix with $N_{dn}$ downlink steering vectors for the $N_{dn}$ selected user terminals, which is $V_{dn} = [\underline{v}_{dn,1} \ \underline{v}_{dn,2} \ \cdots \ \underline{v}_{dn,N_{dn}}]$; and $x_{dn}$ is an $N_{ap} \times 1$ vector with $N_{ap}$ transmit symbols to be sent from the $N_{ap}$ access point antennas.

The access point may also spatially process the downlink data symbol stream for each user terminal with a normalized downlink steering vector $\underline{\tilde{v}}_{dn,m}$ for beam-steering.

If a user terminal is equipped with at least $N_{ap}$ antennas (i.e., $N_{ut,m} \geq N_{ap}$), then the user terminal can perform receiver spatial processing using CCMI, MMSE, or some other technique to isolate and recover its downlink data symbol stream. If a user terminal is equipped with less than $N_{ap}$ antennas (i.e., $N_{ut,m} < N_{ap}$), then the user terminal can recover its downlink data symbol stream in the presence of crosstalk from the other data symbol streams.

For clarity, the SDMA transmission techniques have been described for a single-carrier narrowband MIMO system with flat-fading. These techniques may also be used for a wideband MIMO system and a multi-carrier MIMO system. A wideband MIMO system may utilize CDMA as the underlying wireless technology. A multi-carrier MIMO system may utilize OFDM or some other multi-carrier modulation technique. OFDM effectively partitions the overall system bandwidth into multiple ($N_F$) orthogonal subbands. Each subband is associated with a respective carrier that may be modulated with data.

For a MIMO OFDM system, for each user terminal, the channel estimation may be performed for each of the $N_F$ subbands to obtain $N_F$ frequency-domain channel response matrices for the $N_F$ subbands. The spatial processing may be performed in various manners. In one embodiment, each of the $N_F$ channel response matrices is independently decomposed to obtain $N_F$ steering vectors for the $N_F$ subbands. Spatial processing is then performed for each subband with the steering vector obtained for that subband. In another embodiment, a single frequency-independent steering vector is derived for each user terminal based on the $N_F$ channel response matrices. Spatial processing is then performed for all $N_F$ subbands with this single steering vector. In any case, $N_F$ effective uplink channel response vectors $h_{up,eff,m}(k)$, for k=1 . . . $N_F$, are formed for each user terminal with either the single or $N_F$ steering vectors. The user terminals may be evaluated based on their frequency-dependent effective channel response vectors.

For a wideband MIMO system, for each user terminal, a time-domain channel impulse response matrix may be obtained for each of multiple ($N_P$) resolvable signal paths in the MIMO channel. In one embodiment, $N_P$ steering vectors are derived for each user terminal based on the $N_P$ channel impulse response matrices and used to account for the frequency-selective nature of the MIMO channel. In another embodiment, one steering vector is derived for each user terminal, for example, based on the channel impulse response matrix for the main signal path with the highest energy. In any case, the steering vector(s) may be used to derive one or more effective channel response vectors, which are in turn used to evaluate and select user terminals for transmission.

4. Exemplary MIMO System

Figure 4:
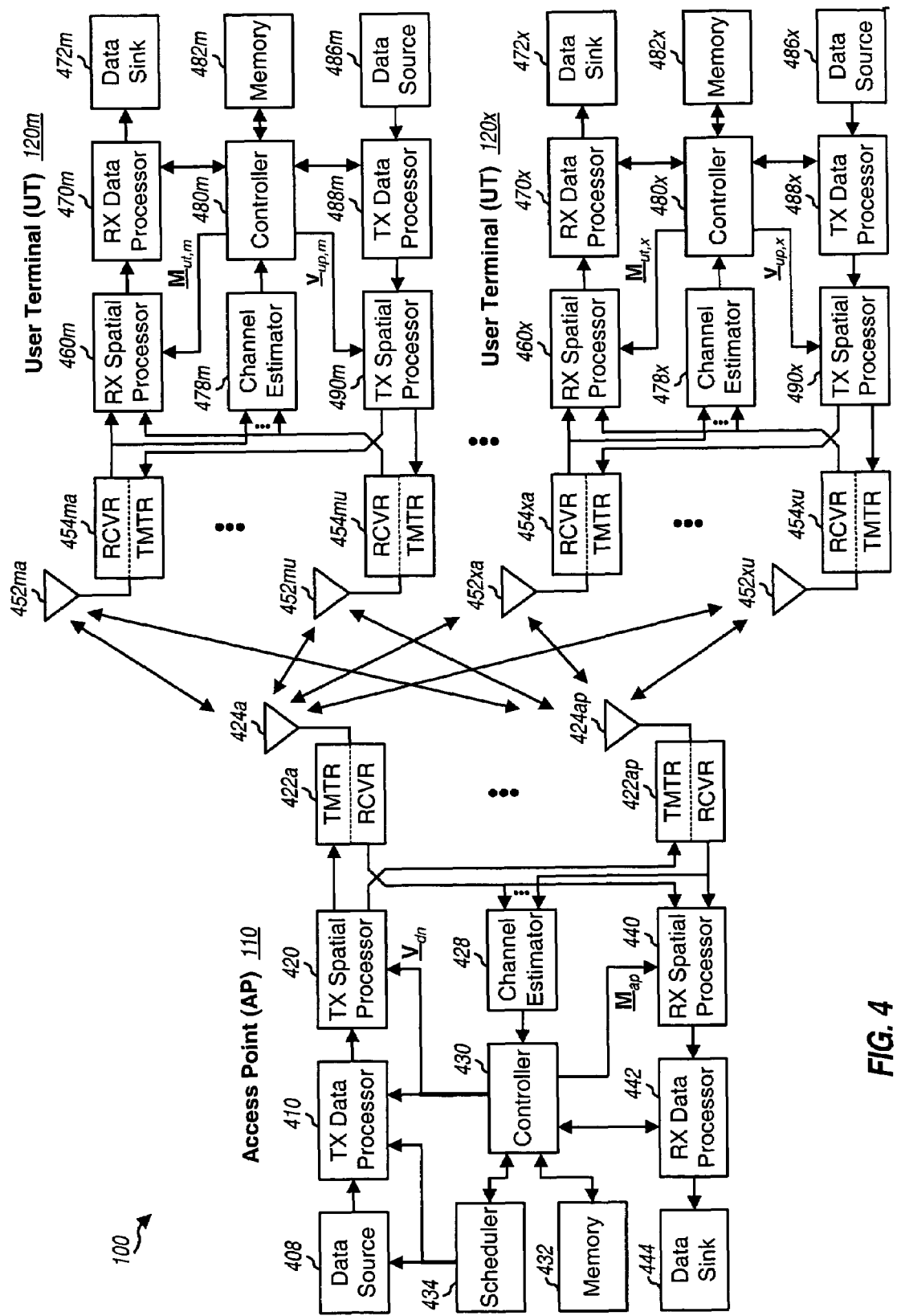
FIG. 4 shows a block diagram of an access point and two user terminals.

FIG. 4 shows a block diagram of access point 110 and two user terminals 120*m* and 120*x* in MIMO system 100. Access point 110 is equipped with $N_{ap}$ antennas 424*a* through 424*ap*. User terminal 120*m* is equipped with $N_{ut,m}$ antennas 452*ma* through 452*mu*, and user terminal 120*x* is equipped with $N_{ut,x}$ antennas 452*xa* through 452*xu*. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. For simplicity, beam-steering is used in the following description.

On the uplink, at each user terminal 120 selected for uplink transmission, a TX data processor 488 receives traffic data from a data source 486 and control data from a controller 480. TX data processor 488 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 490 performs spatial processing on the data symbol stream $\{s_{up,m}\}$ with the steering vector $\underline{v}_{up,m}$, multiplexes in pilot symbols as needed, and provides $N_{ut,m}$ transmit symbol streams for the $N_{ut,m}$ antennas. The steering vector $\underline{v}_{up,m}$ is derived based on the uplink channel response matrix $H_{up,m}$ for the user terminal, as described above. Each transmitter unit (TMTR) 454 receives and processes (e.g., converts to analog, amplifies, filters, and frequency upconverts) a respective transmit symbol stream to generate an uplink signal. $N_{ut,m}$ transmitter units 454 provide $N_{ut,m}$ uplink signals for transmission from $N_{ut,m}$ antennas 452 to the access point.

$N_{up}$ user terminals may be scheduled for simultaneous transmission on the uplink. Each of these user terminals performs spatial processing on its data symbol stream with its steering vector and transmits its set of transmit symbol streams on the uplink to the access point.

At access point 110, $N_{ap}$ antennas 424*a* through 424*ap* receive the uplink signals from all $N_{up}$ user terminals transmitting on the uplink. Each antenna 424 provides a received signal to a respective receiver unit (RCVR) 422. Each receiver unit 422 performs processing complementary to that performed by transmitter unit 454 and provides a received symbol stream. An RX spatial processor 440 performs receiver spatial processing on the $N_{ap}$ received symbol streams from $N_{ap}$ receiver units 422 and provides $N_{up}$ recovered uplink data symbol streams. The receiver spatial processing is performed in accordance with the CCMI, MMSE, SIC, or some other technique. A spatial filter matrix $M_{ap}$ for the access point is derived based on (1) the receiver spatial processing technique used by the access point and (2) the effective uplink channel response matrix $H_{up,eff}$ for the $N_{up}$ user terminals. Each recovered uplink data symbol stream $\{\hat{s}_{up,m}\}$ is an estimate of a data symbol stream $\{s_{up,m}\}$ transmitted by a respective user terminal. An RX data processor 442 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 444 for storage and/or a controller 430 for further processing.

On the downlink, at access point 110, a TX data processor 410 receives traffic data from a data source 408 for $N_{dn}$ user terminals scheduled for downlink transmission, control data from a controller 430, and possibly other data from a scheduler 434. The various types of data may be sent on different transport channels. TX data processor 410 processes (e.g., encodes, interleaves, and modulates) the traffic data for each user terminal based on the rate selected for that user terminal. TX data processor 410 provides $N_{dn}$ downlink data symbol streams for the $N_{dn}$ user terminals. A TX spatial processor 420 performs spatial processing on the $N_{dn}$ downlink data symbol streams with a matrix $V_{dn}$ of $N_{dn}$ downlink steering vectors for the $N_{dn}$ user terminals, multiplexes in pilot symbols, and provides $N_{ap}$ transmit symbol streams for the $N_{ap}$ antennas. Each transmitter unit 422 receives and processes a respective transmit symbol stream to generate a downlink signal. $N_{ap}$ transmitter units 422 provide $N_{ap}$ downlink signals for transmission from $N_{ap}$ antennas 424 to the user terminals.

At each user terminal 120, $N_{ut,m}$ antennas 452 receive the $N_{ap}$ downlink signals from access point 110. Each receiver unit 454 processes a received signal from an associated antenna 452 and provides a received symbol stream. An RX spatial processor 460 performs receiver spatial processing on $N_{ut,m}$ received symbol streams from $N_{ut,m}$ receiver units 454 and provides a recovered downlink data symbol stream $\{\hat{s}_{dn,m}\}$ for the user terminal. The receiver spatial processing is performed in accordance with the CCMI, MMSE, or some other technique. A spatial filter matrix $M_{ut,m}$ for each user terminal is derived based on (1) the receiver spatial processing technique used by the user terminal and (2) the downlink channel response matrix $H_{dn,m}$ for the user terminal. An RX data processor 470 processes (e.g., demodulates, deinterleaves, and decodes) the recovered downlink data symbol stream to obtain decoded data for the user terminal.

At each user terminal 120, a channel estimator 478 estimates the downlink channel response and provides downlink channel estimates, which may include channel gain estimates, SNR estimates, and so on. Similarly, a channel estimator 428 estimates the uplink channel response and provides uplink channel estimates. The steering vectors for downlink and uplink transmission may be derived in various manners depending on whether the MIMO system is a TDD system or an FDD system, as described above. If the steering vector is derived by one entity (e.g., the access point) and needed by another entity (e.g., the user terminal), then the one entity sends the steering vector to the other entity.

Controller 480 for each user terminal typically derives the spatial filter matrix $M_{ut,m}$ for the user terminal based on the downlink channel response matrix $H_{dn,m}$ for that user terminal. Controller 430 derives the spatial filter matrix $M_{ap}$ for the access point based on the effective uplink channel response matrix $H_{up,eff}$. Controller 480 for each user terminal may send feedback information (e.g., the downlink and/or uplink steering vectors, SNR estimates, and so on) to the access point. Controllers 430 and 480 also control the operation of various processing units at access point 110 and user terminal 120, respectively.

Figure 5A:
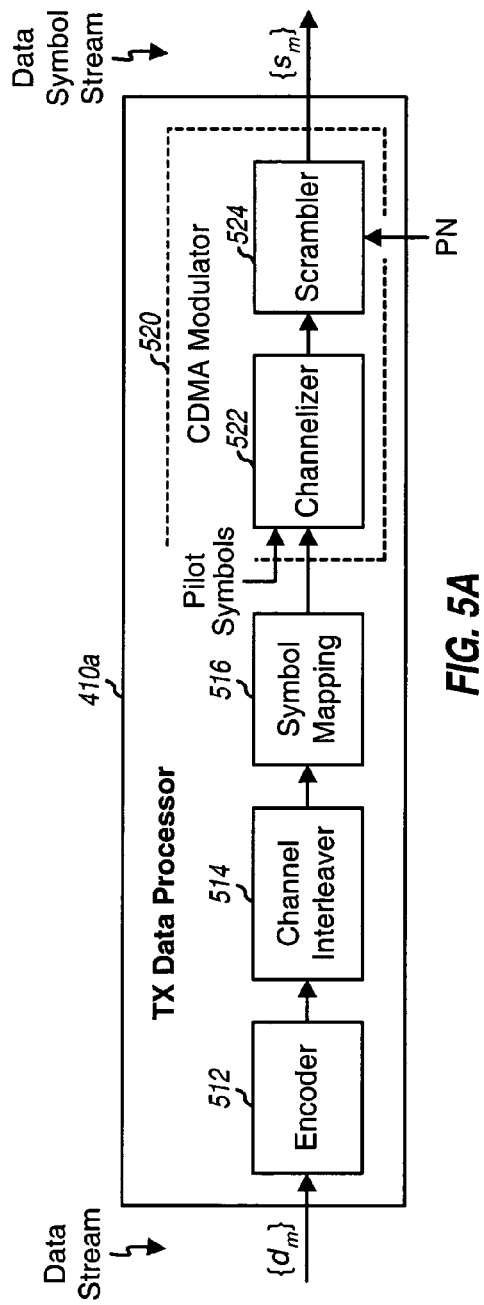
FIGS. 5A and 5B show block diagrams of transmit (TX) data processors for CDMA and OFDM, respectively.

FIG. 5A shows a block diagram of a TX data processor 410a that supports CDMA. TX data processor 410a may be used for TX data processors 410 and 488 in FIG. 4. Within TX data processor 410a, an encoder 512 receives and codes a data stream $\{d_m\}$ for user terminal m based on the coding scheme for the selected rate and provides code bits. The data stream may carry one or more data packets, and each data packet is typically coded separately to obtain a coded data packet. The coding increases the reliability of the data transmission. The coding scheme may include cyclic redundancy check (CRC) coding, convolutional coding, turbo coding, block coding, and so on, or a combination thereof. A channel interleaver 514 interleaves the code bits based on an interleaving scheme. The interleaving provides time, frequency, and/or spatial diversity for the code bits. A symbol mapping unit 516 maps the interleaved bits based on the modulation scheme for the selected rate and provides data symbols. Unit 516 groups each set of B interleaved bits to form a B-bit binary value, where $B \geq 1$, and further maps each B-bit value to a specific modulation symbol based on the modulation scheme (e.g., QPSK, M-PSK, or M-QAM, where $M=2^B$). Each modulation symbol is a complex value in a signal constellation defined by the modulation scheme.

A CDMA modulator 520 performs modulation for CDMA. Within CDMA modulator 520, a channelizer 522 receives and channelizes the data symbols and pilot symbols onto different code channels. Each code channel is associated with a respective orthogonal sequence, which may be a Walsh sequence, an orthogonal variable spreading factor (OVSF) sequence, and so on. The channelization is referred to as "covering" in IS-2000 and IS-95 and "spreading" in W-CDMA. A scrambler 524 receives and spectrally spreads the channelized data for multiple code channels with a pseudo-random number (PN) sequence and provides a stream of data chips, which for simplicity is denoted as a data symbol stream $\{s_m\}$. The spectral spreading is referred to as "spreading" in IS-2000 and IS-95 and "scrambling" in W-CDMA. The channelization and spectral spreading are known in the art and not described herein.

For the uplink, each data symbol stream is transmitted on a respective code channel, which is achieved by channelization with an orthogonal sequence. The $N_{up}$ selected user terminals may concurrently transmit $N_{up}$ or more data streams on different orthogonal code channels. Each user terminal performs spatial processing on all of its data symbol streams (or its data chip stream) with the same steering vector $\underline{v}_{up,m}$ or $\underline{\tilde{v}}_{up,m}$. Similar processing occurs for the downlink.

Figure 5B:
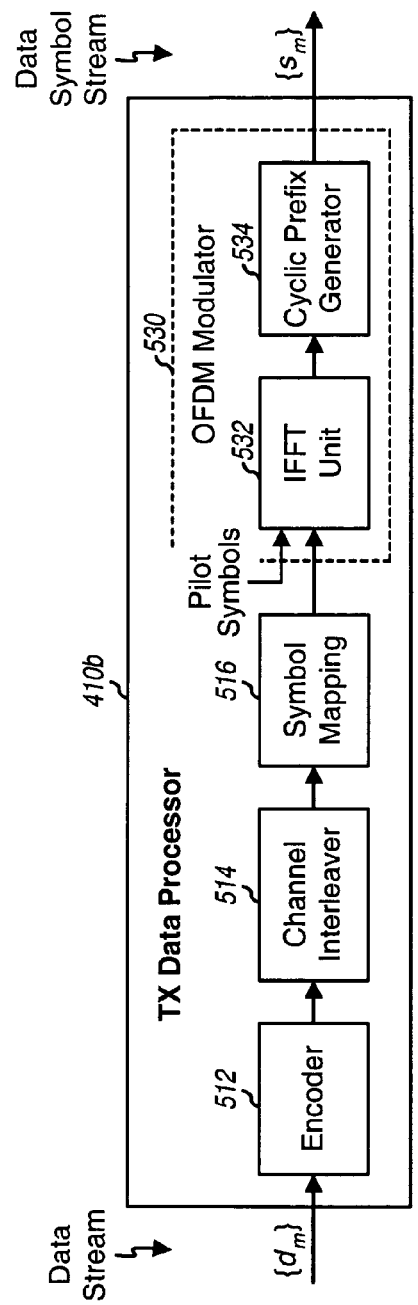

FIG. 5B shows a block diagram of a TX data processor 410b that supports OFDM. TX data processor 410b may also be used for TX data processors 410 and 488 in FIG. 4. TX data processor 410b includes encoder 512, channel interleaver 514, and symbol mapping unit 516, which operate as described above for FIG. 5A. TX data processor 410b further includes an OFDM modulator 530 that performs modulation for OFDM. Within OFDM modulator 530, an inverse fast Fourier transform (IFFT) unit 532 receives the data symbols from symbol mapping unit 516 and pilot symbols, provides the data and pilot symbols on subbands designated for data and pilot transmission, and provides a signal value of zero (a "zero" symbol) for each subband not used for data/pilot transmission. For each OFDM symbol period, IFFT unit 532 transforms a set of $N_F$ data, pilot, and zero symbols to the time domain using an $N_F$-point inverse fast Fourier transform and provides a corresponding transformed symbol that contains $N_F$ chips. A cyclic prefix generator 534 repeats a portion of each transformed symbol to obtain a corresponding OFDM symbol that contains $N_F+N_{cp}$ chips. The repeated portion is referred to as a cyclic prefix, and $N_{cp}$ is the number of chips being repeated. The cyclic prefix ensures that the OFDM symbol retains its orthogonal properties in the presence of multipath delay spread caused by frequency selective fading (i.e., a frequency response that is not flat). Cyclic prefix generator 534 provides a stream of OFDM symbols, which for simplicity is also denoted as a data symbol stream $\{s_m\}$.

For the uplink, each data symbol stream is transmitted on a respective set of subbands assigned for that stream. The $N_{up}$ selected user terminals may concurrently transmit $N_{up}$ or more data streams on different disjoint sets of subbands, where each of the $N_F$ subbands is assigned to at most one set. Each user terminal performs spatial processing on all of its data symbol streams (or its OFDM symbol stream) with the same steering vector $\underline{v}_{up,m}$ or $\underline{\tilde{v}}_{up,m}$. Similar processing occurs for the downlink.

For simplicity, FIGS. 5A and 5B show the processing for one data stream $\{d_m\}$ to obtain one data symbol steam $\{s_m\}$. Multiple data steams (e.g., for multiple user terminals on the downlink) may be processed with multiple instances of the TX data processor to obtain multiple data symbol steams.

FIGS. 5A and 5B show specific implementations in which the processing for CDMA and OFDM are performed prior to the spatial processing for multi-antenna transmission. In this case, the TX data processor includes the CDMA modulator or OFDM modulator, as shown in FIGS. 5A and 5B. The processing for CDMA and OFDM may also be performed after the spatial processing for multi-antenna transmission. In this case, each transmitter unit (TMTR) would include a CDMA modulator or an OFDM modulator that performs CDMA or OFDM processing on a respective transmit symbol stream to generate a corresponding modulated signal.

Figure 6:
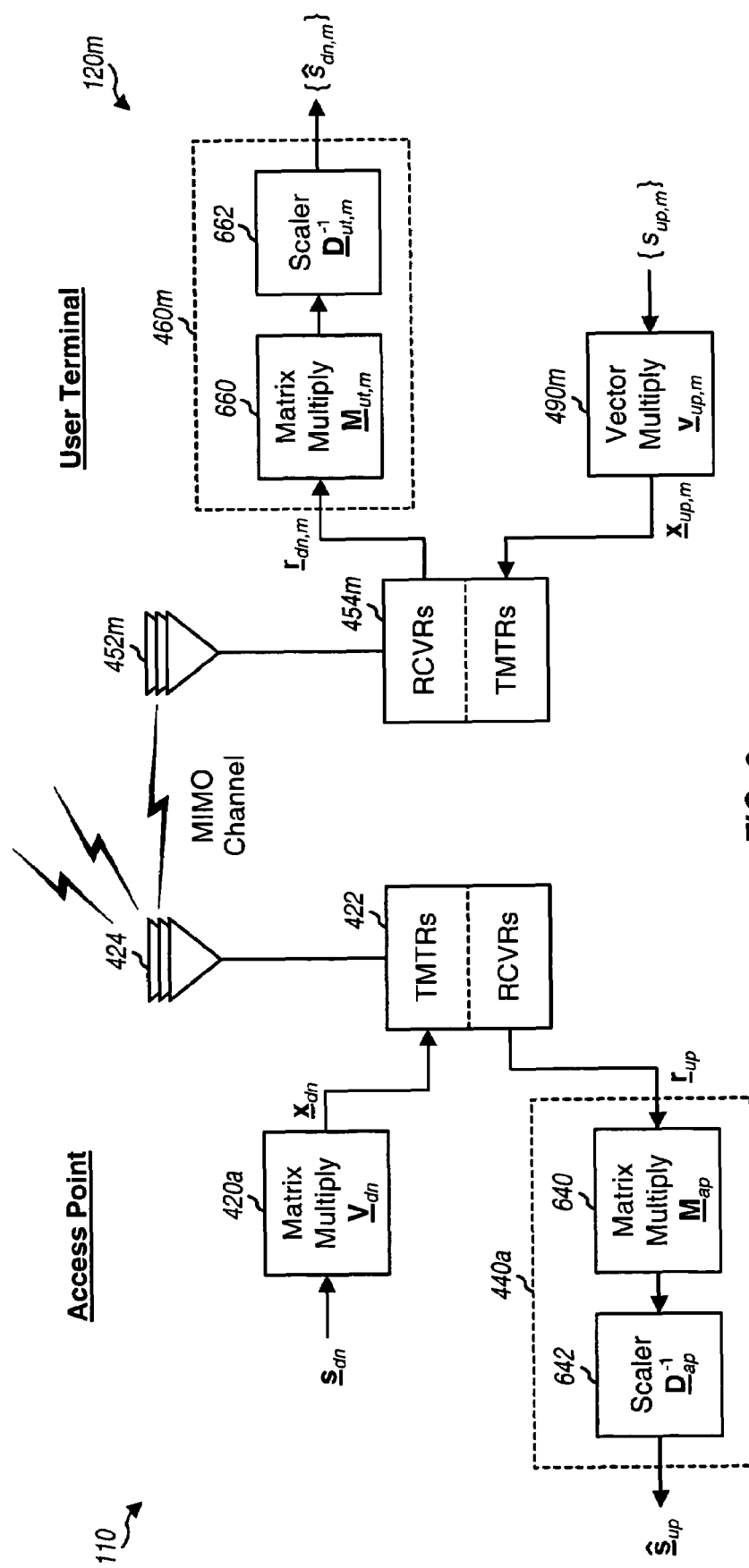
FIG. 6 shows the spatial processing at the access point and one user terminal for downlink and uplink transmission.

FIG. 6 shows the spatial processing at access point 110 and one user terminal 120m for downlink and uplink transmission. For the uplink, at user terminal 120m, the data symbol stream $\{s_{up,m}\}$ is multiplied with the steering vector $\underline{v}_{up,m}$ by TX spatial processor 490m to obtain the transmit symbol vector $x_{up,m}$ for the uplink. At access point 110, the received symbol vector $\underline{r}_{up}$ (for user terminal 120m as well as other user terminals) is multiplied with a spatial filter matrix $M_{up}$ by a unit 640 and further scaled with a diagonal matrix $D_{ap}^{-1}$ by a unit 642 to obtain the recovered data symbol vector $\hat{\underline{s}}_{up}$ for the uplink. Units 640 and 642 are part of an RX spatial processor 440a. The matrices $M_{ap}$ and $D^{ap-1}$ are derived based on the effective uplink channel response matrix $H_{up,eff}$ and using the CCMI, MMSE, or some other technique.

For the downlink, at access point 110, the data symbol vector $\underline{s}_{dn}$ (which includes the downlink data symbol streams for user terminal 120m as well as other user terminals) is multiplied with the downlink steering matrix $V_{dn}$ by TX spatial processor 420 to obtain the transmit symbol vector $x_{dn}$ for the downlink. At user terminal 120m, the received symbol vector $\underline{r}_{dn,m}$ is multiplied with a spatial filter matrix $M_{ut,m}$ by a unit 660 and further scaled with a diagonal matrix $D_{ut,m}^{-1}$ by a unit 662 to obtain a downlink recovered data symbol stream $\{\hat{s}_{dn,m}\}$ for user terminal 120m. Units 660 and 662 are part of RX spatial processor 460m. The matrices $M_{ut,m}$ and $D_{ut,m}^{-1}$ are derived based on the downlink channel response matrix $H_{dn,m}$ for user terminal 120m and using the CCMI, MMSE, or some other technique.

Figure 7:
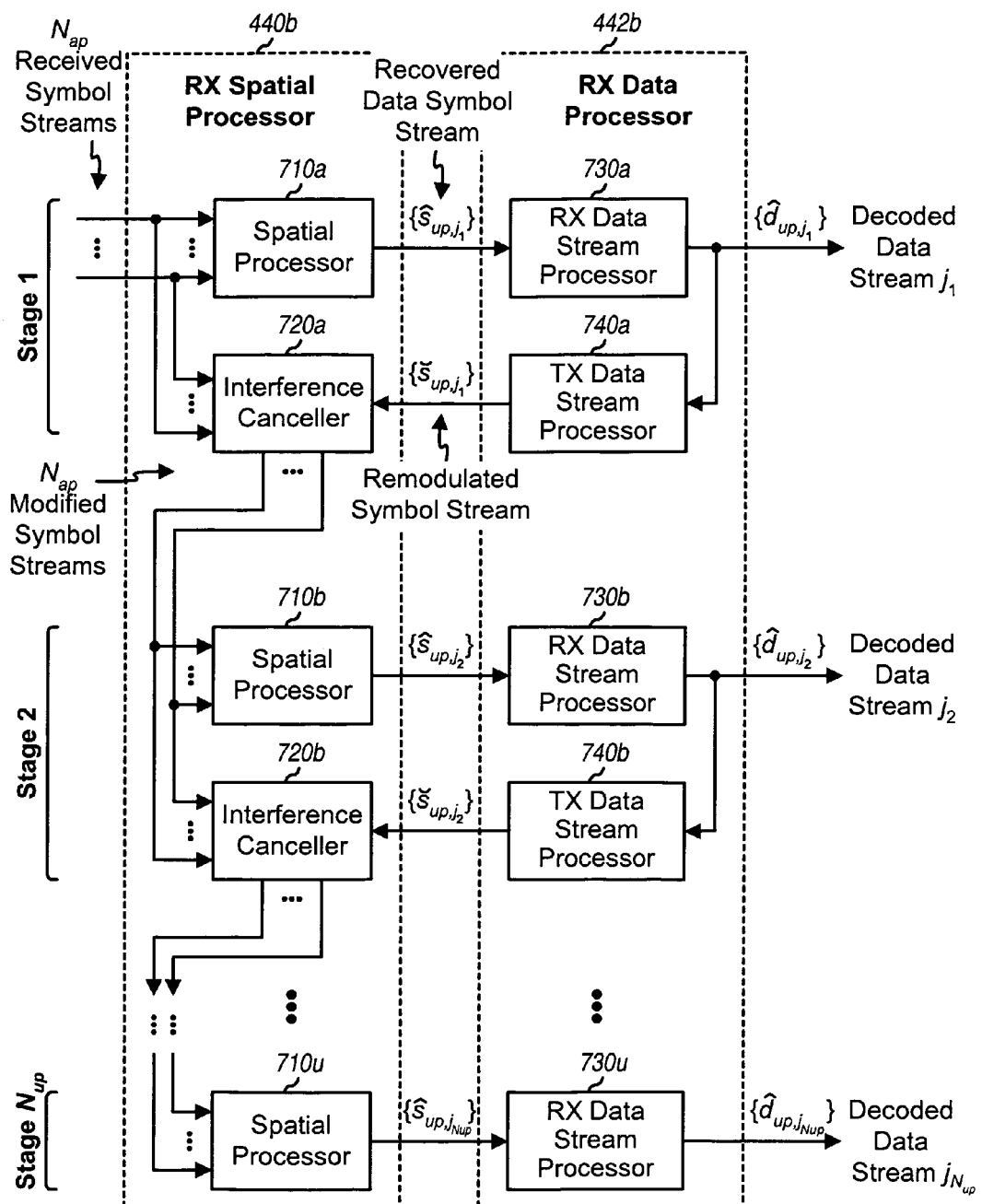
FIG. 7 shows a receive spatial processor and a receive data processor.

FIG. 7 shows a block diagram of an RX spatial processor 440b and an RX data processor 442b, which implement the SIC technique and may be used for access point 110. RX spatial processor 440b and RX data processor 442b implement $N_{up}$ successive (i.e., cascaded) receiver processing stages for $N_{up}$ data symbol streams transmitted by $N_{up}$ user terminals. Each of stages 1 to $N_{up}-1$ includes a spatial processor 710, an interference canceller 720, an RX data stream processor 730, and a TX data stream processor 740. The last stage includes only a spatial processor 710u and an RX data stream processor 730u.

For stage 1, spatial processor 710a performs receiver spatial processing on the $N_{ap}$ received symbol streams and provides one recovered data symbol stream $\{\hat{s}_{up,j_1}\}$ for user terminal $j_1$ being recovered in the first stage. RX data stream processor 730a demodulates, deinterleaves, and decodes the recovered data symbol stream $\{\hat{s}_{up,j_1}\}$ and provides a decoded data stream $\{\hat{d}_{up,j_1}\}$. TX data stream processor 740a encodes, interleaves, and modulates the decoded data stream $\{\hat{d}_{up,j_1}\}$ in the same manner performed by user terminal $j_1$ for that stream and provides a remodulated symbol stream $\{\check{s}_{up,j_1}\}$. Interference canceller 720a performs transmitter spatial processing on the remodulated symbol stream $\{\check{s}_{up,j_1}\}$ with the effective channel response vector $h_{up,eff,j_1}$ for user terminal $j_1$ to obtain $N_{ap}$ interference components due to the data symbol stream $\{s_{up,j_1}\}$. The $N_{ap}$ interference components are subtracted from the $N_{ap}$ received symbol streams to obtain $N_{ap}$ modified symbol streams, which are provided to stage 2.

Each of stages 2 through $N_{up}-1$ performs the same processing as stage 1, albeit on the $N_{ap}$ modified symbol streams from the preceding stage instead of the $N_{ap}$ received symbol streams. The last stage performs spatial processing and decoding on the $N_{ap}$ modified symbol streams from stage $N_{up}-1$ and does not perform interference estimation and cancellation.

Spatial processors 710a through 710u may each implement the CCMI, MMSE, or some other technique. Each spatial processor 710 multiplies an input (received or modified) symbol vector $\underline{r}_{sic}^l$ with a spatial filter matrix $M_{ap}^l$ to obtain a detected symbol vector $\hat{\underline{s}}_{up}^l$, selects and scales one of the detected symbol streams, and provides the scaled symbol stream as the recovered data symbol stream for that stage. The matrix $M_{ap}^l$ is derived based on a reduced effective channel response matrix $H_{up,eff}^l$ for the stage.

Figure 8:
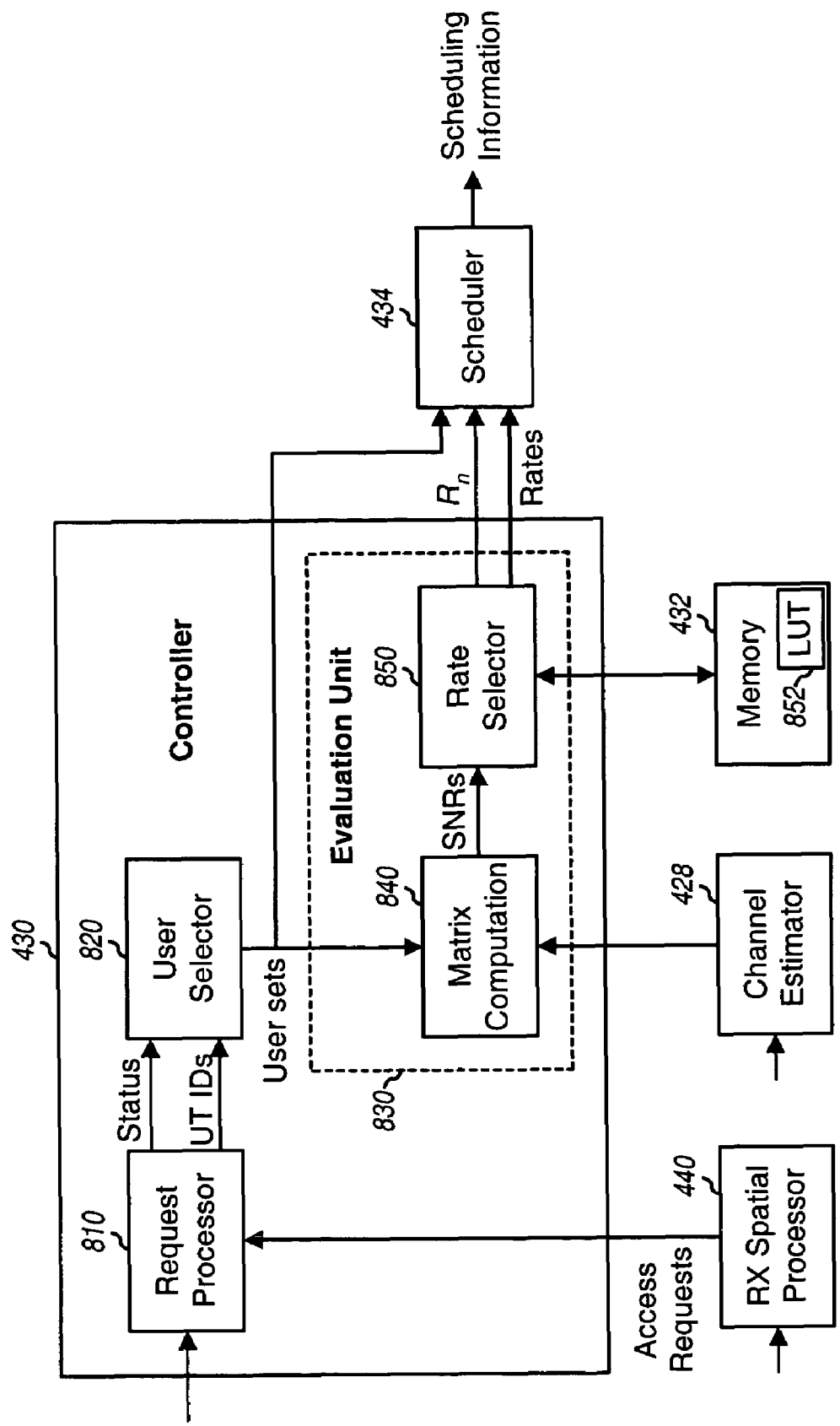
FIG. 8 shows a controller and a scheduler at the access point.

FIG. 8 shows a block diagram of an embodiment of controller 430 and scheduler 434 for evaluating and scheduling user terminals for transmission on the downlink and uplink. Within controller 430, a request processor 810 receives access requests sent by user terminals 120 and possibly access requests from other sources. These access requests are for data transmission on the downlink and/or uplink. For clarity, scheduling for uplink transmission is described below.

Request processor 810 processes the received access requests and provides the identities (IDs) and the status of all active user terminals. A user selector 820 selects different sets of user terminals from among all active user terminals for evaluation. The user terminals may be selected for evaluation based on various factors such as user priority, the amount of data to send, system requirements, and so on.

An evaluation unit 830 evaluates each set of user terminals and provides a value for a metric for the set. For simplicity, the following description assumes that (1) overall throughput is used as the metric and (2) the effective uplink channel response vector is available for each active user terminal. Evaluation unit 830 includes a matrix computation unit 840 and a rate selector 850. Matrix computation unit 840 performs the SNR computation for each set of user terminals. For each set, unit 840 forms the effective uplink channel response matrix $H_{up,eff,n}$ for the set and computes the SNR for each user terminal in the set based on $H_{up,eff,n}$ and the receiver spatial processing technique used by the access point. Rate selector 850 receives a set of SNRs for each user set and determines the rate for each user terminal in the set as well as the overall throughput $R_n$ for the set. Rate selector 850 may access a look-up table (LUT) 852, which stores a set of rates supported by the system and their required SNRs. Rate selector 850 determines the highest rate that may be used for uplink transmission by each user terminal based on the SNR computed for the user terminal. Rate selector 850 also accumulates the rates or throughputs for all user terminals in each set to obtain the overall throughput $R_n$ for the set.

Scheduler 434 receives (1) the different sets of user terminals from user selector 820 and (2) the rates for the user terminals and the overall throughput for each set from rate selector 850. Scheduler 434 selects the best set of user terminals among all sets evaluated for each scheduling interval and schedules the selected user terminals for transmission on the uplink. Scheduler 434 provides scheduling information, which includes the identities of the selected user terminals, their rates, the scheduled transmission time (e.g., the start and the duration of the transmission), and so on. The scheduling information is sent to the selected user terminals.

The scheduling for downlink transmission may be performed in similar manner.

The SDMA transmission techniques described herein may be implemented by various means. For example, these techniques may be implemented in hardware, software, or a combination thereof. For a hardware implementation, the processing units used to support the underlying wireless technology (e.g., CDMA or OFDM) and the SDMA transmission on the downlink and uplink (e.g., the transmit and receive spatial processing at the access point and user terminal, the evaluation of different user sets, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the SDMA transmission techniques described herein may be implemented with modules (e.g., procedures, functions, and so on) that perform the functions described herein. The software codes may be stored in a memory unit (e.g., memory units 432 and 482 in FIG. 4) and executed by a processor (e.g., controllers 430 and 480). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of receiving data in a multiple-input multiple-output (MIMO) communication system, comprising:
   obtaining, from a plurality of receive antennas at a receiving entity, a plurality of received symbol streams for a plurality of data symbol streams sent by a plurality of transmitting entities, one data symbol stream for each transmitting entity, wherein the data symbol stream for each transmitting entity is spatially processed with a steering vector for the transmitting entity and sent from a plurality of transmit antennas at the transmitting entity; and
   processing the plurality of received symbol streams in accordance with a receiver spatial processing technique to obtain a plurality of recovered data symbol streams, which are estimates of the plurality of data symbol streams,
   wherein the steering vector for each transmitting entity is derived by:
      decomposing a channel response matrix for the transmitting entity to obtain a plurality of eigenvectors and a plurality of singular values, and
      forming the steering vector for the transmitting entity based on an eigenvector corresponding to a largest singular value among the plurality of singular values.

2. The method of claim 1, wherein the receiver spatial processing technique is a channel correlation matrix inversion (CCMI) technique or a minimum mean square error (MMSE) technique.

3. The method of claim 1, wherein the receiver spatial processing technique is a successive interference cancellation (SIC) technique.

4. The method of claim 1, wherein the steering vector for each transmitting entity is equal to the eigenvector corresponding to the largest singular value.

5. The method of claim 1, wherein the steering vector for each transmitting entity contains a plurality of elements having same magnitude and phases equal to phases of a plurality of elements of the eigenvector corresponding to the largest singular value.

6. A method of receiving data in a multiple-input multiple-output (MIMO) communication system, comprising:
   obtaining, from a plurality of receive antennas at a receiving entity, a plurality of received symbol streams for a plurality of data symbol streams sent by a plurality of transmitting entities, one data symbol stream for each transmitting entity, wherein the data symbol stream for each transmitting entity is spatially processed with a steering vector for the transmitting entity and sent from a plurality of transmit antennas at the transmitting entity;
   processing the plurality of received symbol streams in accordance with a receiver spatial processing technique to obtain a plurality of recovered data symbol streams, which are estimates of the plurality of data symbol streams;
   evaluating each of a plurality of sets of transmitting entities for possible transmission based on a metric and steering vectors for the transmitting entities in the set; and
   selecting a set of transmitting entities with a highest metric value for transmission.

7. An apparatus at a receiving entity in a multiple-input multiple-output (MIMO) communication system, comprising:
   a plurality of receiver units operative to obtain from a plurality of receive antennas a plurality of received symbol streams for a plurality of data symbol streams sent by a plurality of transmitting entities, one data symbol stream for each transmitting entity, wherein the data symbol stream for each transmitting entity is spatially processed with a steering vector for the transmitting entity and sent from a plurality of transmit antennas at the transmitting entity; and
   a receive spatial processor operative to process the plurality of received symbol streams in accordance with a receiver spatial processing technique to obtain a plurality of recovered data symbol streams, which are estimates of the plurality of data symbol streams,
   wherein the steering vector for each transmitting entity is derived by:
      decomposing a channel response matrix for the transmitting entity to obtain a plurality of eigenvectors and a plurality of singular values, and
      forming the steering vector for the transmitting entity based on an eigenvector corresponding to a largest singular value among the plurality of singular values.

8. The apparatus of claim 7, wherein the receiver spatial processing technique is a channel correlation matrix inversion (CCMI) technique or a minimum mean square error (MMSE) technique.

9. An apparatus at a receiving entity in a multiple-input multiple-output (MIMO) communication system, comprising:
- means for obtaining from a plurality of receive antennas a plurality of received symbol streams for a plurality of data symbol streams sent by a plurality of transmitting entities, one data symbol stream for each transmitting entity, wherein the data symbol stream for each transmitting entity is spatially processed with a steering vector for the transmitting entity and sent from a plurality of transmit antennas at the transmitting entity; and
- means for processing the plurality of received symbol streams in accordance with a receiver spatial processing technique to obtain a plurality of recovered data symbol streams, which are estimates of the plurality of data symbol streams,
- wherein the steering vector for each transmitting entity is derived by:
  - decomposing a channel response matrix for the transmitting entity to obtain a plurality of eigenvectors and a plurality of singular values, and
  - forming the steering vector for the transmitting entity based on an eigenvector corresponding to a largest singular value among the plurality of singular values.

10. The apparatus of claim 9, wherein the receiver spatial processing technique is a channel correlation matrix inversion (CCMI) technique or a minimum mean square error (MMSE) technique.

11. A method of deriving steering vector for data transmission in a multiple-input multiple-output (MIMO) communication system, comprising:
- obtaining a channel response matrix indicative of a response of a MIMO channel between a transmitting entity and a receiving entity in the MIMO system;
- decomposing the channel response matrix to obtain a plurality of eigenvectors and a plurality of singular values, one eigenvector for each singular value; and
- deriving the steering vector for the transmitting entity based on an eigenvector corresponding to a largest singular value among the plurality of singular values, and
- wherein a plurality of steering vectors are derived for a plurality of transmitting entities and used for spatial processing by the plurality of transmitting entities to concurrently transmit a plurality of data symbol streams to the receiving entity.

12. The method of claim 11, wherein the steering vector for each transmitting entity is the eigenvector corresponding to the largest singular value.

13. The method of claim 11, wherein the steering vector for each transmitting entity contains a plurality of elements having same magnitude and phases equal to phases of a plurality of elements of the eigenvector corresponding to the largest singular value.

14. An apparatus in a multiple-input multiple-output (MIMO) communication system, comprising:
- a channel estimator operative to obtain a channel response matrix indicative of a response of a MIMO channel between a transmitting entity and a receiving entity in the MIMO system; and
- a controller operative to decompose the channel response matrix to obtain a plurality of eigenvectors and a plurality of singular values, one eigenvector for each singular value and to derive the steering vector for the transmitting entity based on an eigenvector corresponding to a largest singular value among the plurality of singular values, and
- wherein a plurality of steering vectors are derived for a plurality of transmitting entities and used for spatial processing by the plurality of transmitting entities to concurrently transmit a plurality of data symbol streams to the receiving entity.

15. An apparatus in a multiple-input multiple-output (MIMO) communication system, comprising:
- means for obtaining a channel response matrix indicative of a response of a MIMO channel between a transmitting entity and a receiving entity in the MIMO system;
- means for decomposing the channel response matrix to obtain a plurality of eigenvectors and a plurality of singular values, one eigenvector for each singular value; and
- means for deriving the steering vector for the transmitting entity based on an eigenvector corresponding to a largest singular value among the plurality of singular values, and
- wherein a plurality of steering vectors are derived for a plurality of transmitting entities and used for spatial processing by the plurality of transmitting entities to concurrently transmit a plurality of data symbol streams to the receiving entity.

* * * * *